United States Patent Office 2,957,009
Patented Oct. 18, 1960

2,957,009

METAL SALTS OF OPEN-CHAIN DIHYDROXY-DIOIC ACIDS AND ESTERS, THEIR MONOLACTONE ACIDS, SALTS, ESTERS, AND AMIDES AND THEIR PREPARATION

Howard E. Holmquist and John C. Sauer, Wilmington, Del., assignors to E. I. du Pont de Nemours and Company, Wilmington, Del., a corporation of Delaware No Drawing. Filed Nov. 25, 1955, Ser. No. 549,154

18 Claims. (Cl. 260—343.5)

This invention relates to new compositions of matter and to methods for their preparation. More particularly this invention relates to novel alkali metal salts of dihydroxy-dioic acid esters, to their monolactone acids, monolactone acid salts, monolactone monoamides, and monolactone monoesters, and to methods for their preparation.

New dilactones are obtained when acetylenes are reacted with carbon monoxide in the presence of a catalytic amount of a cobalt carbonyl. These new dilactones and their preparation are the subject matter of the copending patent application of J. C. Sauer, Ser. No. 432,599, filed May 26, 1954, now abandoned, and continuation-in-part application thereof Ser. No. 549,155, filed November 25, 1955, now U.S. Patent 2,840,570, issued June 24, 1958. These new dilactones correspond in composition to $C_8(RR')_2O_4$, wherein R and R' are hydrogen, haloaryl, alkoxyaryl, or hydrocarbon free from non-aromatic unsaturation, and show strong absorption lines in the ultraviolet spectra in the region of 3300–4400 A. and yield suberic acids on hydrogenation over platinum in acetic acid.

It is an object of this invention to provide new compositions of matter and methods for their preparation. A further object is to provide a new class of novel alkali metal salts of dihydroxy-dioic acid esters, their monolactone acids, monolactone acid salts, monolactone monoamides and monolactone monoesters, and methods for their preparation. A still further object is to provide novel dyestuffs. Other objects will appear hereinafter.

These and other objects of this invention are accomplished by providing a new class of compounds, the alkali metal salts of 4,5-dihydroxy-2,4,6-octatriene-1,8-dioic acid esters, their monolactone acids, monolactone acid salts, monolactone monoamides and monolactone monoesters. These alkali metal salts of 4,5-dihydroxy-2,4,6-octatriene-1,8-dioic acid esters correspond in molecular formula to $(RR'R'')_2 \cdot C_8O_6(M)_2$, wherein M is an alkali metal such as sodium, potassium, lithium and the like, R and R' are hydrogen, haloaryl, alkoxyaryl, or hydrocarbon radicals free from non-aromatic unsaturation and R'' is an alkyl radical, such as methyl, ethyl, dodecyl and the like, particularly of 1 to 12 carbon atoms. One of the unsaturated carbon atoms in each of the 2,3 and 6,7 positions has attached thereto R and the other carbon atom in each of said positions has attached thereto R'. Each of the carbon atoms in the 1,8 positions is attached through oxygen to R''.

These alkali metal salts of dihydroxy-dioic acid esters are formed when a dilactone of the aforesaid formula $C_8(RR')_2O_4$ is treated with an alkali metal alkoxide in acoholic medium. When the unsaturated dilactone $C_8H_4O_4, [\Delta^{2,2'(5H,5'H)}$-bifuran]-5,5'-dione is treated with an alkali metal alkoxide there is obtained an alkali metal salt of the diester of 4,5-dihydroxy-2,4,6-octatriene-1,8-dioic acid corresponding to the formula

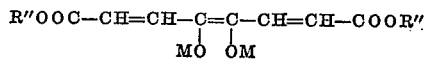

wherein M is an alkali metal and R'' is an alkyl radical, particularly of 1 to 12 carbon atoms.

The monolactone monoesters are obtained by acidifying the alkali metal salts of the dihydroxydioic acid esters. The new monolactone compounds of this invention are prepared by subjecting a dilactone of the aforesaid formula $C_8(RR')_2O_4$ to reaction with a basic reagent and then acidifying the resulting reaction mixture. When the basic reagent is an aqueous alkali metal hydroxide, there is obtained, on acidification, the monolactone acid. When the basic reagent is alcoholic alkali metal alkoxide there is obtained on acidification a monolactone monoester. When the basic reagent is ammonium hydroxide, or a primary or secondary monoamine, there is obtained on acidification a monolactone monoamide. Thus, this invention provides the new monolactone acids and their carboxyl derivatives which are hydrolyzable thereto, i.e., the monolactone acid salts, monolactone monoamides and monolactone monoesters.

The new monolactones of this invention are monolactone acids and their monolactone salts, monolactone amides and monolactone monoesters of 4,5-dihydroxy-2,4,6-octatriene-1,8-dioic acids, i.e., of dihydroxydioic acids of the formula

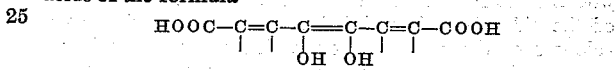

wherein one of the carbon atoms in each of the 2,3 and 6,7 positions has attached thereto R and the other carbon atom in each of said positions has attached thereto R', said R and R' being hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e.g., alkyl, especially short chain alkyl, i.e., contain less than 7 carbon atoms, aryl, especially where the aryl radical is hydrocarbon of not more than 10 carbon atoms, aralkyl, especially of not more than 7 carbon atoms, or cycloalkyl, particularly of not more than 7 carbon atoms. Examples of such radicals R and R' are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecyloxynaphthyl, chlorophenyl, chloronaphthyl, and the like.

This invention includes particularly the monolactone acid, its salts, monoamides and monoesters of 4,5-dihydroxy-2,4,6-octatriene-1,8-dioic acid of the formula

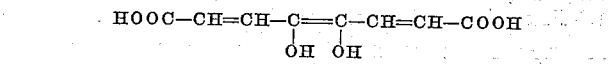

It has been discovered that if the dilactone $C_8H_4O_4$, $[\Delta^{2,2'(5H,5'H)}$-bifuran]-5,5'-dione, is subjected to mild alkaline hydrolysis and acidified there is obtained the new monolactone of 4,5-dihydroxy-2,4,6-octatriene-1,8-dioic acid.

The amides and esters of the monolactones of this invention are shown by infrared data to be gamma-monolactones having the structural formula

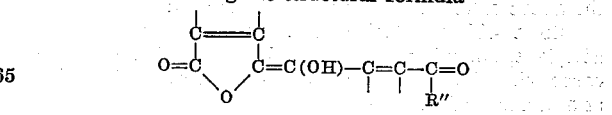

wherein one free valence of the ring and one free valence of the side chain is satisfied by R and the other free valences of the ring and of the side chain are satisfied by R', said R and R' being defined as aforesaid with respect to the 4,5-dihydroxy-2,4,6-octatriene-1,8-dioic acid and R'' is an alkoxy or amino or N-monosubstituted or N,N-disubstituted amino group. Examples of such amino and substituted amino radicals R″ are amino, NH₂; alkylamino, dialkylamino and alkylarylamino, such as n-butylamino, dimethylamino, n-octadecylamino, methylcyclohexylamino, and dodecylphenylamino. Examples of such alkoxy radicals R″ are ethoxy, butoxy and dodecyloxy, and particularly alkoxy radicals of 1 to 12 or more carbon atoms.

When R and R' are hydrogen, the amides and esters are the monolactone monoamides and monoesters of 4,5-dihydroxy-2,4,6-octatriene-1,8-dioic acid, and are represented by the following structural formula

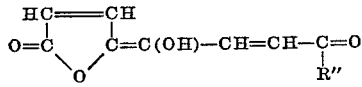

where R″ is an alkoxy or amino or substituted amino group as aforesaid.

The monolactone acids of this invention are shown by the infrared data to be delta-monolactones, rather than gamma-monolactones, and have the structural formula

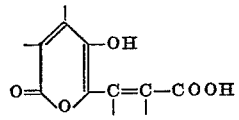

wherein one free valence of the ring and one free valence of the side chain is satisfied by R and the other free valences of the ring and of the side chain are satisfied by R', said R and R' being defined as aforesaid with respect to the formula representing the monolactone monoamides and monoesters.

When R and R' are hydrogen, the structural formula represents the monolactone acid of 4,5-dihydroxy-2,4,6-octatriene-1,8-dioic acid and is as follows:

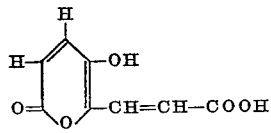

The examples which follow are submitted to illustrate and not to limit this invention.

EXAMPLE I

*Monolactone of N-p-carboxyphenyl monoamide of 4,5-dihydroxy-2,4,6-octatriene-1,8-dioic acid*

A solution of 8.4 g. of the unsaturated dilactone, [Δ²,²′(5H,5′H)-bufuran]-5,5′-dione, prepared as described subsequently, and 14.5 g. of p-aminobenzoic acid in 300 ml. of acetic acid was refluxed for 6 hours. The cooled solution yielded 14.5 g. of the monolactone of N-p-carboxyphenyl monoamide of 4,5-dihydroxy-2,4,6-octatriene-1,8-dioic acid, a yellow product, M.P. 258–263° C.

*Analysis.*—Calc'd. for C₁₅H₁₁O₆N: C, 59.80; H, 3.68; N, 4.65. Found: C, 59.10; H, 3.95; N, 4.70.

By infrared analysis, bands were found at 3.75, 3.9, and 5.9μ (for carboxyl), at 5.65μ (for gamma-lactone carbonyl), and at 12.3μ (for p-substituted aromatic) which accord with the formula for the gamma-monolactone of N-p-carboxyphenyl monoamide of 4,5-dihydroxy-2,4,6-octatriene-1,8-dioic acid.

The dilactone, [Δ²,²′(5H,5′H)-bifuran]-5,5′-dione, used in the above example was prepared as follows:

Into a 400-ml. steel reactor was charged 26 g. of acetylene, 200 ml. of acetone, and 1.5 g. of dicobalt octacarbonyl. The mixture was heated with carbon monoxide at a pressure of 1000 atmospheres for 14–17 hours. The product was filtered and the brown solid was extracted with ethyl acetate for 24 hours. The extract was permitted to crystallize and the crystalline material which separated was dried at room temperature. There was obtained 20 g. of a compound which by analysis corresponded to C₈H₄O₄ and after recrystallization from ethyl acetate melted at 236° C., and had a k₃₄₀₀ A.=205. This dilactone, [Δ²,²′(5H,5′H)-bifuran]-5,5′-dione, exists in the form of two structural isomers, which yield suberic acid when hydrogenated with platinum in acetic acid. The normal or low melting form, 230–237° C., is the trans form and the high melting form, 240–248° C., is the cis form. The formulae of these structural isomers of [Δ²,²′(5H,5′H)-bifuran]-5,5′-dione are as follows:

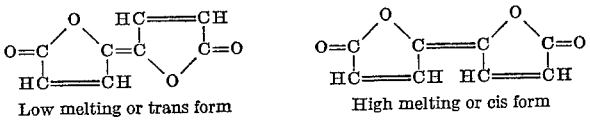

Low melting or trans form     High melting or cis form

EXAMPLE II

*Monolactone monoamide of 4,5-dihydroxy-2,4,6-octatriene-1,8-dioic acid*

A solution of 15.5 g. of the dilactone of Example I in 200 ml. of concentrated ammonium hydroxide was prepared by stirring with gentle warming for a few minutes. The orange-brown solution was filtered and acidified with concentrated hydrochloric acid with external cooling. The yellow precipitate weighed 4.0 g. when dry and was soluble in dilute aqueous sodium hydroxide. The product, the monolactone monoamide of 4,5-dihydroxy-2,4,6-octatriene-1,8-dioic acid, analyzed:

*Analysis.*—Calc'd. for C₈H₇O₄N: C, 53.04; H, 3.90; N, 7.73. Found: C, 52.64; H, 4.11; N, 7.75, 7.71.

By infrared analysis bands were found at 5.6μ (for gamma-lactone) at 5.95 and 6.1μ (for amide) and 6.2, 6.45, and 6.52μ (for conjugated unsaturation). These data, together with the analysis, are in accord with the structure corresponding to the gamma-monolactone monoamide of 4,5-dihydroxy-2,4,6-octatriene-1,8-dioic acid.

EXAMPLE III

*Monolactone of 4,5-dihydroxy-2,4,6-octatriene-1,8-dioic acid*

To 200 ml. of 10% sodium hydroxide, there was added at room temperature 36.6 g. of the dilactone of Example I. Solution occurred exothermically in a few minutes. The solution was filtered and acidified with concentrated hydrochloric acid to give a yellow precipitate which weighed 40 g., after drying in a vacuum oven at 60° C. The compound was soluble in 5% sodium bicarbonate solution and it analyzed:

*Analysis.*—Calc'd. for C₈H₆O₅: C, 52.75; H, 3.32; N, eq., 91. Found: C, 52.73, 52.62; H, 3.54, 3.59; N. eq., 93.

The elemental analysis and neutral equivalent are in accord with a structure corresponding to a monolactone of 4,5-dihydroxy-2,4,6-octatriene-1,8-dioic acid. Infrared analysis showed bands at 3.9 and 6.0μ (for carboxyl), and 6.2, 6.3, and 6.5μ (for conjugated unsaturation). The infrared absorption at 5.9μ is consistent with the delta-lactone structure assigned to the free acid.

To 60 g. of the unsaturated dilactone of Example I there was added 450 ml. of 10% aqueous sodium hydroxide and the mixture warmed until solution resulted. The solution was then filtered to remove 3.2 g. of unchanged dilactone. The filtrate was poured into a solution of 100 ml. of acetic acid in 900 ml. of water. After scratching the walls of the container with a glass rod, there separated 46.7 g. (61%) of a yellow-orange solid. The analysis indicated the solid to be the monosodium salt of the open chain acid, 4,5-dihydroxy-2,4,6-octatriene-1,8-dioic acid.

*Analysis.*—Calc'd. for C₈H₇O₆Na: C, 43.25%; H, 3.18%; Na, 10.35%. Found: C, 43.33%, 43.20; H, 3.31%, 3.31; Na, 10.2%.

By infrared analysis bands were found at 6.45μ and 7.3μ for carboxylate. These are consistent with the structure corresponding to the above compound.

The monosodium salt of the open chain acid is soluble in water but does not react with 5% aqueous sodium bicarbonate. A 3.5% aqueous solution has a pH of 5.3. Aluminum, nickelic, cobaltic, ferric, manganic, and cupric salts are precipitated from aqueous solutions of the monosodium salt by addition of the proper cation. Thus, heavy metal salts of 4,5-dihydroxy-2,4,6-octatriene-1,8-dioic acid are made by adding the appropriate cation to a solution of 0.35 g. of the monosodium salt of the acid in 10 ml. of water. The metal salt added to obtain the appropriate metal cation and the color of the product is given in the table below:

| Salt added: | Color of product |
|---|---|
| $Ni(NO_3)_2$ | Yellow. |
| $Co(OAc)_2$ | Yellow-orange. |
| $MnSO_4$ | Yellow. |
| $Al(OAc)_3$ | Yellow. |
| $FeCl_3$ | Dark brown. |
| $Cu(OAc)_2$ | Pale green. |
| $Ba(OH)_2$ | Yellow. |

When the monosodium salt of the open chain acid is heated to 120° C., it turns a bright red from loss of one molecule of water, to form the lactone ring. The monolactone acid monosodium salt melts at 250° to 255° C. (dec.).

*Analysis.*—Calc'd. for $C_8H_5O_5Na$: C, 47.08%; H, 2.47%. Found: C, 47.21%, 47.32%; H, 2.48%, 2.58.

Both salts absorb ultraviolet light at 3930 A. The extinction coefficients are respectively 85 and 94 for the open-chain and ring-containing salts.

The di- and trisodium salts from the monosodium salt of the acid are prepared by adding the calculated amount of 1 N sodium hydroxide, filtering, evaporating to dryness under reduced pressure, and washing with ethanol by trituration.

The disodium salt is yellow in color, is much more soluble in water than is the trisodium salt, and appears to be a dihydrate.

*Analysis.*—Calc'd. for $C_8H_{10}O_8Na_2$: C, 34.29; H, 3.60. Found: C, 33.97; H, 3.76.

The pale orange monohydrate salt was obtained by heating the dihydrate in a vacuum oven at 65° C. for several hours.

*Analysis.*—Calc'd. for $C_8H_8O_7Na_2$: C, 36.65; H, 3.08. Found: C, 37.72; H, 2.72.

The orange anhydrous salt was obtained by heating the dihydrate at 120° C. for one hour.

*Analysis.*—Calc'd. for $C_8H_6O_6Na_2$: C, 39.35; H, 2.48. Found: C, 40.47; H, 2.23.

The yellow trisodium salt was recovered as the monohydrate.

*Analysis.*—Calc'd. for $C_8H_7O_7Na_3$: C, 33.82; H, 2.48. Found: C, 35.13; H, 2.60.

The anhydrous salt was obtained by heating the monohydrate at 120° C.

*Analysis.*—Calc'd. for $C_8H_5O_6Na_3$: C, 36.10; H, 1.89. Found: C, 37.30; H, 2.19.

EXAMPLE IV

*Monolactone of N-p-tolyl-monoamide of 4,5-dihydroxy-2,4,6-octatriene-1,8-dioic acid*

A solution of 3.7 g. of the dilactone of Example I, 12.3 g. of p-toluidine, and 600 ml. of dioxane was heated at reflux temperature for 8 hours. The solution was partially evaporated under reduced pressure causing a yellow precipitate (3.0 g., 49%) to form. The compound was recrystallized several times from a large quantity of acetone, M.P. 244–252° C. (dec.). The product, the monolactone of N-p-tolyl-monoamide of 4,5-dihydroxy-2,4,6-octatriene-1,8-dioic acid, analyzed:

*Analysis.*—Calc'd. for $C_{15}H_{13}O_4N$: C, 66.41; H, 4.83; N, 5.16. Found: C, 66.23; H, 4.89; N, 5.31, 5.29.

By infrared analysis bands were found at 5.65μ (for gamma-lactone carbonyl), at 6.2, 6.25, 6.5, and 6.65μ (for conjugated unsaturation), and at 12.3μ (for p-substituted aromatic).

The infrared data and analysis are in accord with a structure corresponding to the gamma-monolactone of the N-p-tolyl-monoamide of 4,5-dihydroxy-2,4,6-octatriene-1,8-dioic acid.

EXAMPLE V

*Monolactone of N-n-butyl-monoamide of 4,5-dihydroxy-2,4,6-octatriene-1,8-dioic acid*

To 13 g. of the dilactone of Example I there was added 30 ml. of n-butylamine in 60 ml. of dioxane, with external cooling, to form a deep red solution which was filtered and acidified with acetic acid to form a copious yellow precipitate, 13.7 g. (75%). A sample of this new compound from a similar run was recrystallized from ethyl acetate and had a melting point of 166° C. Addition of two drops of 5% ferric chloride solution to a solution of the compound in methanol gave a deep red coloration. The product analyzed:

*Analysis.*—Calc'd. for $C_{12}H_{15}O_4N$: C, 60.75; H, 6.37; N, 5.90; M.W., 237. Found: C, 60.65, 60.55; H, 6.38, 6.18; N, 5.96, 5.96; M.W. 230, 245.

The infrared spectrum of the new compound resembles that of the unsubstituted amide of Example II, with an additional band at 3.4μ (for saturated —CH—). These data and the analysis are in accord with a structure corresponding to the gamma-monolactone of N-n-butyl-monoamide of 4,5-dihydroxy-2,4,6-octatriene-1,8-dioic acid.

EXAMPLE VI

*Monoacetone of N,N-dimethyl-monoamide of 4,5-dihydroxy-2,4,6-octatriene-1,8-dioic acid*

To 100 ml. of a 25% aqueous dimethylamine solution there was added 23.1 g. of the dilactone of Example I. The solution was filtered and acidified with dilute hydrochloric acid to give a crude yellow precipitate (32.8 g.). The crude product was extracted with hot methyl ethyl ketone. Yellow crystals separated from the cooled extract and were recrystallized from chloroform. The new compound gave a positive ferric chloride test and its composition was in accord with a 1:1 adduct of the dimethylamine and the dilactone. The analysis of the product, the gamma-monolactone of the N,N-dimethyl-monoamide of 4,5-dihydroxy-2,4,6-octatriene-1,8-dioic acid, and the infrared data are also in accord with a structure corresponding to that compound.

*Analysis.*—Calc'd. for $C_{10}H_{11}O_4N$: C, 57.41; H, 5.30; N, 6.70. Found: C, 57.54; N, 5.20; N, 6.74, 6.63.

EXAMPLE VII

*Monolactone monomethyl ester of 4,5-dihydroxy-2,4,6-octatriene-1,8-dioic acid*

There was added 15.3 g. (0.093 mole) of the dilactone of Example I with stirring to a solution of 5.2 g. (0.096 mole) of sodium methoxide in 200 ml. of methanol. To this mixture glacial acetic acid (6 ml.) was added and the yellow precipitate (15.7 g.) collected and dried. By chilling the filtrate, another 1.1 g. was obtained. The total yield was 16.8 g. (92%). The compound, which was sparingly soluble in water and did not react with dilute sodium bicarbonate solution, could be readily purified by recrystallization from methanol or methyl ethyl ketone, M.P. 184° C. (dec.). The analysis of the product was as follows:

*Analysis.*—Calc'd. for $C_9H_8O_5$: C, 55.10; H, 4.11. Found: C, 55.19, 55.18; H, 4.40, 4.14.

By infrared analysis bands were found at 3.4μ (for saturated —CH—), at 3.8μ (for hydrogen bonding between enolic hydrogen and ester carbonyl), at 5.65μ (for gamma-lactone carbonyl), at 5.75μ (for ester carbonyl), and at 6.2 and 6.3μ (for conjugated unsaturation). The analysis and infrared data are in accord with a structure corresponding to the gamma-monolactone monomethyl ester of 4,5-dihydroxy-2,4,6-octatriene-1,8-dioic acid.

EXAMPLE VIII

*Monolactone of N-n-octadecyl-monoamide of 4,5-dihydroxy-2,4,6-octatriene-1,8-dioic acid*

A mixture of 4.1 g. (0.025 mole) of the dilactone of Example I, 13.6 g. (0.05 mole) of n-octadecylamine and 74 ml. of dioxane was heated on the steam bath until solution was complete (about one hour). Hydrochloric acid was then added and the orange precipitate (2.6 g.) collected and recrystallized from chloroform. The recrystallized product had a melting point of 135–140° C. From the filtrate there was obtained another 12.3 g. of material, M.P. 95–100° C. The product analyzed:

*Analysis.*—Calc'd. for $C_{26}H_{43}O_4N$: C, 72.01; H, 10.00; N, 3.23. Found: C, 71.95, 71.55, 71.49; H, 10.19, 10.13, 10.18; N, 3.39, 3.35.

The analysis corresponded with the values calculated for a 1:1 adduct of n-octadecylamine and the dilactone, i.e., the monolactone of N-n-octadecyl monoamide of 4,5-dihydroxy-2,4,6-octatriene-1,8-dioic acid.

EXAMPLE IX

*Monolactone of N-dimethylcyclohexyl-monoamide of 4,5-dihydroxy-2,4,6-octatriene-1,8-dioic acid*

Monolactone of N-dimethylcyclohexyl-monoamide of 4,5-dihydroxy-2,4,6-octatriene-1,8-dioic acid was prepared by reaction of the dilactone of Example I (8.2 g.) in methanol (100 ml.) with 13 g. of a mixture of dimethylcyclohexylamine isomers. The solution was warmed on the steam bath for a few minutes and 0.7 g. of unchanged unsaturated dilactone recovered by filtration. The filtrate was acidified with 10 ml. of glacial acetic acid, causing precipitation of 7.7 g. (53%) of a tan solid. The solid was purified by dissolving in ethyl acetate and evaporating the filtered solution.

*Analysis.*—Calc'd. for $C_{16}H_{21}O_4N$: C, 65.95; H, 7.27; N, 4.81. Found: C, 63.61; H, 8.03; N, 4.76.

EXAMPLE X

*Monolactone of n-dodecylmonoanilide of 4,5-dihydroxy-2,4,6-octatriene-1,8-dioic acid*

A solution of 16.4 g. of the dilactone of Example I, 52 g. of a commercial $C_{12}$ alkyl-substituted anilines (n-dodecylaniline) in 250 ml. of dioxane was refluxed for 8 hours. The solution was filtered to remove 0.55 g. of a yellow-orange solid which was recrystallized from methyl ethyl ketone. The solid had a M.P. of 199–201° C. The compound was a 1:1 adduct of the amine and the lactone, i.e., a monolactone of n-dodecylmonoanilide of 4,5-dihydroxy-2,4,6-octatriene-1,8-dioic acid.

*Analysis.*—Calc'd. for $C_{26}H_{35}O_4N$: C, 73.38; H, 8.29; N, 3.29. Found: C, 73.13; H, 8.25; N, 3.38, 3.46.

EXAMPLE XI

*Part A.—Isomerization of trans isomer of the dilactone to the cis isomer*

The dilactone of Example I, the trans isomer, was isomerized to the cis isomer of the dilactone by treatment with phosphoric acid, as follows:

A 19-g. sample of the dilactone of Example I (M.P. 236° C., $k_{3600 A.}=205$) was heated with 85% phosphoric acid (300 ml.) on the steam bath for several hours. The undissolved material (5.8 g.) was collected by filtration. The cooled filtrate yielded 4.8 g. of crystals. Each of these solids was recrystallized repeatedly from methyl ethyl ketone. Various crystallization fractions melted from 246°–248° C. and were each shown by composition and ultraviolet and infrared absorption to be the cis isomer of the dilactone (total conversion 56%). The purified recrystallized material melted at 248° C., had a $k_{3340 A.}=221$, and analyzed:

*Analysis.*—Calc'd. for $C_8H_4O_4$: C, 58.55; H, 2.46. Found: C, 58.71, 58.87; H, 2.60, 2.66.

The infrared spectrum shows very strong absorption at 6.0μ and a doublet at 6.5μ. The former is due to the central double bond in the cis structure and the doublet to the double bonds of each ring. In the original (trans) isomer the center double bond is astride a center of symmetry; therefore, there is no strong band at 6.0μ and only a single band at 6.5μ.

*Part B.—Monolactone monomethyl ester of 4,5-dihydroxy-2,4,6-octatriene-1,8-dioic acid*

To a solution of 5.15 g. of this cis isomer of the dilactone in 100 ml. of methanol there was added 1.9 g. of sodium methoxide with stirring. After a few minutes 3 ml. of acetic acid was added and a yellow precipitate collected (5.55 g.; 90%). This compound was shown by a mixed melting point determination to be identical with the product described in Example VII, the monolactone monomethyl ester of 4,5-dihydroxy-2,4,6-octatriene-1,8-dioic acid.

EXAMPLE XII

*Monolactone N-n-butyl-monoamide of 4,5-dihydroxy-2,4,6-octatriene-1,8-dioic acid*

A slurry of 3.6 g. of the cis isomer of the dilactone as prepared in Example XI in 50 ml. of dioxane was treated with 4 ml. of n-butylamine. The solution was filtered and carefully acidified with acetic acid. The yellow precipitate (2.2 g.; 42%) was recrystallized from ethyl acetate, M.P. 162–164° C. This compound was shown by a mixed melting point determination to be identical with the product of Example V, the monolactone N-n-butyl-monoamide of 4,5-dihydroxy-2,4,6-octatriene-1,8-dioic acid.

EXAMPLE XIII

*Monolactone of 4,5-dihydroxy-2,4,6-octatriene-1,8-dioic acid*

The action of 50 ml. of 10% sodium hydroxide on 8.2 g. of the cis isomer of the dilactone as prepared in Example XI resulted in complete solution in a few minutes. The filtered solution was acidified with concentrated hydrochloric acid to give a bright yellow precipitate which weighed 8.9 when dry. The infrared data indicated that the acid was identical with that of Example III, the monolactone of 4,5-dihydroxy-2,4,6-octatriene-1,8-dioic acid.

EXAMPLE XIV

*Part A.—Disodium salt of the dimethyl ester of 4,5-dihydroxy-2,4,6-octatriene-1,8-dioic acid*

To a solution of sodium methoxide (10.8 g., 0.2 mole) in methanol (300 ml.) there was added 32.5 g. (0.2 mole) of the unsaturated dilactone, $[\Delta^{2,2'(5H,5'H)}]$-bifuran]-5,5'-dione. A reddish-orange precipitate amounting to 8 g. (15% of theory) was obtained. This material melted at 160° C. with decomposition.

*Analysis.*—Calc'd. for $C_{10}H_{10}O_6Na_2$: C, 44.12; H, 3.70. Found: C, 44.76, 44.64; H, 3.49, 3.59.

The above product, the sodium salt of the dimethyl ester of 4,5-dihydroxy-2,4,6-octatriene-1,8-dioic acid corresponded to the formula

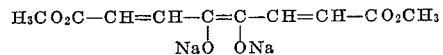

In water, this salt had a pH of 9.6.

*Part B.—Monolactone monomethyl ester of 4,5-dihydroxy-2,4,6-octatriene-1,8-dioic acid*

By dissolving the salt prepared in Part A in methanol and adding acetic acid to the solution, the monolactone monomethyl ester of 4,5-dihydroxy-2,4,6-octatriene-1,8-dioic acid was obtained. This same monolactone ester was obtained in 67% yield by trituration of the salt with 85% phosphoric acid. The same product was also obtained by treatment of the salt with aqueous ammonium chloride.

EXAMPLE XV

*Disodium salt of the dimethyl ester of 4,5-dihydroxy-2,4,6-octatriene-1,8-dioic acid*

Example XIV, Part A, was repeated using 50 g. of [$\Delta^{2,2'(5H,5'H)}$-bifuran]-5,5'-dione (0.3 mole), 300 ml. of methanol and 34 g. of sodium methoxide (0.16 mole) and stirring for one hour. The reddish-orange salt obtained weighed 46.6 g., which corresponds to a 50% yield of the sodium salt of the dimethyl ester of 4,5-dihydroxy-2,4,6-octatriene-1,8-dioic acid.

EXAMPLE XVI

*Dilithium salt of dimethyl ester of 4,5-dihydroxy-2,4,6-octatriene-1,8-dioic acid*

Lithium wire (4.5 g.) was stirred with methanol (300 ml.) until complete dissolution occurred. To the resulting solution of lithium methoxide [$\Delta^{2,2'(5H,5'H)}$-bifuran]-5,5'-dione (50 g.) was added with stirring. After two hours, a brick red solid (54.9 g.) was collected by filtration. It darkened at 217–223° but had no melting point. Its composition corresponded to the following formula:

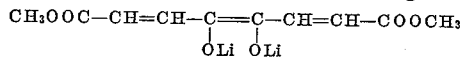

*Analysis.*—Calc'd. for $C_{10}H_{10}O_6Li_2$: C, 50.01; H, 4.20. Found: C, 50.68; H, 3.97.

This lithium salt of the dimethyl ester of 4,5-dihydroxy-2,4,6-octatriene-1,8-dioic acid was soluble in water and in excess methanol.

The monolactones of the 4,5-dihydroxy-2,4,6-octatriene-1,8-dioic acid and its methyl ester of this invention are convertible to the cis form of the dilactone, [$\Delta^{2,2'(5H,5'H)}$-bifuran]-5,5'-dione, as illustrated below:

EXAMPLE A

A small sample of the monolactone of 4,5-dihydroxy-2,4,6-octatriene-1,8-dioic acid described in Example III was heated on the steam bath with 15 ml. of acetic anhydride. The filtered, cooled solution gave crystals of the cis isomer of the unsaturated dilactone, [$\Delta^{2,2'(5H,5'H)}$-bifuran-5,5'-dione, M.P. 243° C., $k_{3340\,A.}=19$.

EXAMPLE B

A solution of 0.7 g. of the monolactone acid described in Example III in 10 ml. of concentrated sulfuric acid was warmed gently on the steam bath for several hours. The solution was poured into ethanol to give a precipitate which was shown to be the cis isomer of the unsaturated dilactone, [$\Delta^{2,2'(5H,5'H)}$-bifuran]-5,5'-dione, $k_{3340\,A.}=224$.

EXAMPLE C

A solution of 1 g. of the methyl ester of the monolactone acid described in Example VII in 20 ml. of acetic acid and 20 ml. of water to which two drops of concentrated sulfuric acid had been added was heated under reflux for 6 hours. The cooled solution yielded 0.6 g. of neutral crystals having $k_{3340\,A.}=215$, the cis isomer of the unsaturated dilactone.

As illustrated in Example XI the cis form of the dilactone can be obtained by isomerizing the trans form of the dilactone with strong acids. Alternatively, the cis form of the dilactone can be obtained directly from acetylene and carbon monoxide by including hydrogen sulfide in the reaction mixture, as illustrated below.

A stainless steel pressure reactor was charged with 1.5 g. of cobalt carbonyl and 80 g. of acetone. The reactor was closed, chilled, and evacuated. It was further charged with 20 g. of hydrogen sulfide and 26 g. of acetylene. After heating at 95–112° C. under a carbon monoxide pressure of 780–960 mm. for 17 hours, the reactor was opened and the contents discharged. It was a dark liquid with a small amount of black powdered solid. The entire product was transferred to a Soxhlet extractor and extracted with acetone for 24 hours. The extract contained no solid material but upon concentration, 0.3 g. of solid crystallized in rectangular platelets. Upon recrystallization from ethyl acetate, it melted at 245° C. Further concentration of the filtrate gave 0.2 g. more of crystalline solid. This substance analyzed 58.17% C and 2.74 H, as compared to 58.50% C and 2.44% H for $C_8H_4O_4$. The product from an identical run had an absorption maximum in the ultraviolet at 3340 A.

In the working examples, the hydrolysis of the dilactone has been effected at temperatures varying from normal room temperature to reflux at atmospheric pressure.

Specific examples of usefully employable hydrolytic agents are ammonium, sodium, potassium, and lithium hydroxides, mono- and dibutylamines, mono- and dioctylamines, N-methylaniline, N-octylaniline, N-cyclohexylaniline, benzylamine, N-methylbenzylamine, cyclohexylamine, N-cyclohexylaniline, toluidines, xylylamines, sodium ethoxide, potassium butoxide, sodium dodecyloxide, aminotoluic acids, dimethylamine, octadecylamine, p-anisidine, piperidine, morpholine, and other monoamines having hydrogen attached to amino-nitrogen with the amino groups as the sole functional group reactive toward carboxyl.

The hydrolytic agent and dilactone are used in at least 1:1 molar amounts. In practice, however, it is preferred to use amounts of the hydrolytic agent which are several times the molar amount of the dilactone present in the reaction mixture.

The hydrolysis is usually effected in the presence of a reaction medium and suitable media are water, alcohols, such as methanol, ethanol, etc.; ethers, such as dioxane; hydrocarbons, such as benzene, toluene, xylene, isooctane, and the like.

The strength of the acid used in acidifying the reaction mixture after hydrolysis with aqueous alkali metal or alkaline earth metal hydroxide determines the nature of the product obtained. As illustrated by Example III, with hydrochloric acid the product is the monosodium salt of the monolactone acid while with acetic acid it is the monosodium salt of the open chain acid.

The amount of reaction medium is not critical but for convenience of operation an amount is usually employed which exceeds the combined weight of the reactants by several fold. The reaction medium may be a solvent for the dilactone and hydrolytic reactant or it may be a solvent for one and not for the other.

Although in the working examples the dilactone from acetylene and carbon monoxide has been used, it is to be understood that in its place there may be used any dilactone produced in accord with the copending application of J. C. Sauer, U.S. Ser. No. 432,599, filed May 26, 1954, now abandoned, and in the continuation-in-part patent application thereof filed November 25 1955. These dilactones conform to the general formula $C_8(RR')_2O_4$ wherein the R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e.g., alkyl especially short chain alkyl, i.e., containing less than 7 carbon atoms, aryl, especially where the aryl radical is hydrocarbon of not more than 10 carbon atoms, aralkyl, especially of not more than 7 carbons, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecyloxynaphthyl, chlorophenyl, and the like. These dilactones show strong absorption lines in the ultraviolet spectra in the region of 3300 to 4400 A. and yield suberic acids on hydrogenation with platinum in acetic acid.

These dilactones can be position isomers corresponding to the cis and trans forms of

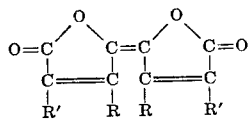

of

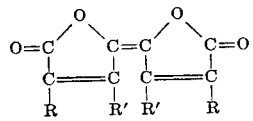

and of

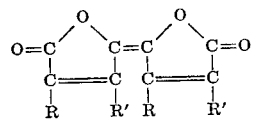

wherein R and R' are defined as aforesaid. These unsaturated dilactones can be represented by the general formulas

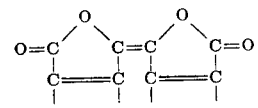

and

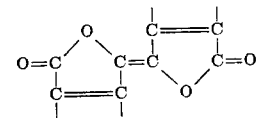

wherein one free valence of each ring is satisfied by R and the other free valences of said rings are satisfied by R', said R and R' being defined as aforesaid.

These dilactones are obtained by reacting an acetylene with carbon monoxide in an inert organic solvent in the presence of a cobalt carbonyl catalyst. In one method of operation, a pressure reactor is charged with an inert organic solvent and a catalytic amount of a cobalt carbonyl catalyst, the reactor is closed, cooled to 0° C., or lower, and evacuated. A predetermined amount of acetylene is then admitted from a storage vessel calibrated so that the amount of acetylene delivered is measured by the drop in pressure, and the reactor placed in a shaking device. Carbon monoxide is introduced to between 50 and 3000 atmospheres and the charge heated and agitated at 80 to 175° C. These conditions are maintained until there is no further reaction, as evidenced by cessation of pressure drop. Throughout the reaction period the pressure within the reactor is maintained within the desired limits by periodic injections of carbon monoxide.

After reaction is complete the reactor is permitted to cool, unreacted acetylene and carbon monoxide are vented to the atmosphere, and the reaction mixture slurried with an inert organic solvent. The slurry is filtered and the residue on the filter extracted with a hot inert organic solvent. The extract is cooled and the crystalline product which separates is filtered and dried.

The acetylenes used in preparing these dilactones correspond to R—C≡C—R', wherein R and R' are hydrogen, alkoxyaryl, especially where the alkoxy radicals is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals which are free from non-aromatic unsaturation, especially of not more than 12 carbon atoms, e.g., alkyl, especially short chain alkyl, i.e., containing less than seven carbon atoms, aryl, especially where the aryl radical is hydrocarbon of not more than 10 carbon atoms, aralkyl, especially of not more than seven carbon atoms, or cycloalkyl, particularly of not more than seven carbon atoms. Examples of such radicals are methyl, ethyl, octyl, decyl, dodecyl, phenyl, tolyl, xylyl, naphthyl, benzyl, cyclohexyl, methylcyclohexyl, chlorophenyl, chloronaphthyl, methoxyphenyl, ethoxyphenyl, decyloxyphenyl, dodecyloxyphenyl, dodecyloxynaphthyl, and the like. Examples of such acetylenes are acetylene, methyl acetylene, 2-decyne, phenylacetylene, naphthylacetylene, p-chlorophenylacetylene, p-ethoxyphenylacetylene, p-decycloxyphenylacetylene, benzylacetylene, cyclohexylacetylene, methylcyclohexylacetylene, etc.

By employing such substituted acetylenes in preparing the dilactones $C_8(RR')_2O_4$, the radicals R and R' will correspond to the substituents attached to the triply bonded carbon atoms in the acetylene reactant, i.e., R and R' in R—C≡C—R'. Thus, as shown by said Sauer continuation-in-part application, Serial No. 549,155, filed November 25, 1955, there are prepared the dilactones:

[$\Delta^{2,2'(5H,5'H)}$-bi(phenylfuran)]-5,5'-dione,
[$\Delta^{2,2'(5H,5'H)}$-bi(diethylfuran)]-5,5'-dione,
[$\Delta^{2,2'(5H,5'H)}$-bi(n-butylfuran)]-5,5'-dione,
[$\Delta^{2,2'(5H,5'H)}$-bi($\beta$-naphthylfuran)]-5,5'-dione,
[$\Delta^{2,2'(5H,5'H)}$-bi(chlorophenylfuran)]-5,5'-dione,
[$\Delta^{2,2'(5H,5'H)}$-bi(o-methoxyphenylfuran)] - 5,5'-dione and the like By employing these dilactones prepared from the substituted acetylenes, there are obtained the alkali metal salts of the 4,5-dihydroxy-2,4,6-octatriene-1,8-dioic acid esters, their monolactone acids, monolactone acid salts, monolactone monoamides and monolactone monoesters of the general formulas heretofore set forth in which R and R' corresponded to the substituents R and R' in said dilactones and in said substituted acetylenes from which the dilactones are prepared.

The following illustrates formation of a sodium salt from a substituted [$\Delta^{2,2'(5H,5'H)}$-bifuran]-5,5'-dione.

To a solution of 5.2 g. of [$\Delta^{2,2'(5H,5'H)}$-bi(phenylfuran)]-5,5'-dione in 100 ml. of methanol, there was added 1.8 g. of sodium methoxide. Almost immediately a red precipitate, weighing 4.3 g. formed. The product by analysis corresponds to the monosodium salt of the monomethyl ester of the diphenyl substituted monolactone acid.

*Analysis.*—Calc'd. for $C_{21}H_{15}O_5$ Na: C, 68.13; H, 4.08. Found: C, 68.75, 68.00, 68.33; H, 4.43, 4.24, 4.41.

Addition of 2 ml. of acetic acid to a solution of 4.2 g. of the monosodium salt of the monomethyl ester of the monolactone acid in 30 ml. of methanol yielded a yellow precipitate, weighing 2.9 g., of the higher melting isomer of the original dilactone. After recrystallization this material melted at 208° C.

*Analysis.*—Calc'd. for $C_{20}H_{12}O_4$: C, 75.94; H, 3.82. Found: C, 75.34; H, 3.76.

The substituted dilactone, [$\Delta^{2,2'(5H,5'H)}$-bi(phenylfuran)]-5,5'-dione, was prepared as follows:

A pressure reactor was charged with 100 ml. of acetone, 1.5 g. of cobalt carbonyl, and 80 g. of phenylacetylene. The charge was heated at 91°–110° C. for 15.5 hours under a carbon monoxide pressure of 770–965 atmospheres. The reaction mixture was filtered and the product on the filter separated and recrystallized twice from xylene. There was obtained 22 g. of a crystalline dilactone melting at 146–175° C. From the filtrate and mother liquor there was obtained an additional 3.5 g., making a total of 25.5 g. of the dilactone, [$\Delta^{2,2'(5H,5'H)}$-bi(phenyl)-furan)]-5,5'-dione. The molecular weight value obtained for this dilactone was 325, as compared with the theoretical value of 316 for $C_{20}H_{12}O_4$. This dilactone showed a maximum absorption in the ultraviolet at 3820 A. and the specific absorptivity coefficient $k_{3820 A.}=118$.

*Analysis.*—Calc'd. for $C_{20}H_{12}O_4$: C, 75.9; H, 3.8; mol. wt., 316. Found: C, 76.3; H, 3.9; mol. wt., 325.

The free monolactone acid from [$\Delta^{2,2'(5H,5'H)}$-bi(phenylfuran)]-5'5-dione was prepared as follows:

A mixture of 4.3 g. of [$\Delta^{2,2'(5H,5'H)}$-bi(phenylfuran)]-5,5'-dione, 1.2 g. of sodium hydroxide, and 25 ml. of water was heated on the steam bath for about 2 hours. The solution was then filtered. There was recovered 0.5 g. of unchanged starting material. The filtrate was acidified with acetic acid to give 1.8 g. of an orange solid. The solid was digested with dilute hydrochloric acid for several days to remove any sodium salts present. Recrystallization from ethyl acetate gave a small amount of orange [$\Delta^{2,2'(5H,5'H)}$-bi(phenylfuran)]-5,5'-dione, M.P. 298 to 302° C., and the yellow monolactone acid, M.P. 132 to 134° C.

*Analysis.*—Calc'd. for $C_{20}H_{14}O_5$: C, 71.85; H, 4.22. Found: C, 71.68; H, 4.29.

The reaction between the acetylene and carbon monoxide is carried out batchwise or continuously in the presence of an inert organic liquid medium. By "inert organic liquid medium," as used herein, is meant organic liquids which contain no active hydrogen, as determined by the Zerewitinoff method [Ber. 40, 2026 (1927); J. Am. Chem. Soc. 49, 3181 (1927)]. Thus, the acetylene is the only compound in the reaction system which may contain active hydrogen. Specific inert organic liquids are isooctane, toluene, acetonitrile, acetone, ethyl acetate, dioxane, diethyl ether, xylene, benzene, etc. The nitriles and ketones are in general preferred over the hydrocarbons and ethers.

In the formation of the dilactones, there are actually involved 2 moles of an acetylene and 4 moles of carbon monoxide. In practice, this ratio is attained by charging a weighed sample of the acetylene into the reactor and then injecting carbon monoxide in amount sufficient to provide 2 moles thereof per mole of acetylene. Employing a 400 ml. reactor and 25–30 g. of acetylene, the amount of carbon monoxide injected is that which will provide a total pressure in the range of 500–3000 atmospheres at reaction temperature.

The reaction is conducted until there is no further pressure drop and this generally requires from 10–20 hours, although shorter or longer reaction times can be employed. Throughout the reaction period the pressure within the reactor is maintained by periodic injections of carbon monoxide.

The new monolactone acids of this invention are useful inhibitors for the air-oxidation of animal and vegetable oils, as biological chemicals, and as dyestuffs for wool, nylon, etc., as more particularly illustrated below:

A dye bath composed of 0.06 g. of the monolactone acid of Example III, a few drops of dispersing agent (a naphthalenesulfonic acid-formaldehyde condensation product), a trace of benzoic acid, and 100 ml. of water was heated on the steam bath. Pieces of cloth made from wool, nylon, and acetate, were added. After 30 minutes the pieces of cloth were removed from the dye bath and washed with water. The wool and nylon had been dyed yellow and the acetate pale yellow.

The monolactone ester (0.05 g.) of Example VII was evaluated as a dye in the manner described above and found to dye wool, nylon, and acetate, respectively, orange, pale yellow, and very pale yellow.

The monolactone N-n-butylamide (0.05 g.) of Example V was evaluated as a dye as described above and found to dye wool, nylon, and acetate, respectively, orange, pale yellow, and very pale yellow.

The monolactone N,N-dimethylamide (0.03 g.) of Example VI was evaluated as a dye as described above and found to dye wool and nylon yellow.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing monolactones which comprises reacting [$\Delta^{2,2'(5H,5'H)}$-bifuran]-5,5'-dione with an alkali metal alkoxide of 1 to 12 carbon atoms in an alkanol of 1 to 12 carbon atoms, acidifying the resulting reaction mixture with an acid selected from the class consisting of acetic, hydrochloric, and phosphoric acids, and separating as the resulting product a gamma-monolactone alkyl monester of 4,5-dihyroxy-2,4,6-octatriene-1,8-dioic acid wherein the alkyl radical is of 1 to 12 carbon atoms.

2. In a process for preparing monolactones, the step of reacting [$\Delta^{2,2'(5H,5'H)}$-bifuran]-5,5'-dione with an alkali metal alkoxide of 1 to 12 carbon atoms in an alkanol of 1 to 12 carbon atoms and obtaining as the resulting product an alkali metal salt of an alkyl diester of the open-chain 4,5-dihydroxy-2,4,6-octatriene-1,8-dioic acid wherein the alkyl radicals are of 1 to 12 carbon atoms.

3. Process for preparing monolactones which comprises reacting [$\Delta^{2,2'(5H,5'H)}$-bifuran]-5,5'-dione with an alkali metal hydroxide in aqueous medium, acidifying the resulting reaction mixture with hydrochloric acid, and separating as the resulting product, the deta-monolactone of 4,5-dihydroxy-2,4,6-octatriene-1,8-dioic acid.

4. Process for preparing monolactones which comprises reacting [$\Delta^{2,2'(5H,5'H)}$-bifuran]-5,5'-dione with a basic reagent selected from the class consisting of ammonium hydroxide, primary alkyl and secondary dialkyl monoamines wherein the alkyl radicals are of not more than 18 carbon atoms, acidifying the resulting reaction mixture with an acid selected from the class consisting of acetic, hydrochloric, and phosphoric acids, and separating as the resulting product, a gamma-monolactone monoamide of 4,5-dihydroxy-2,4,6-octatriene-1,8-dioic acid.

5. An alkali metal salt of an open-chain 4,5-dihydroxy-2,4,6-octatriene-1,8-dioic acid alkyl ester having the formula

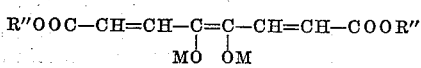

wherein M is an alkali metal and R″ is an alkyl radical of 1 to 12 carbon atoms.

6. A disodium salt of an open-chain 4,5-dihydroxy-2,4,6-octatriene-1,8-dioic acid alkyl ester having the formula

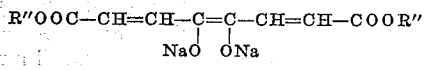

wherein R″ is an alkyl radical of 1 to 12 carbon atoms.

7. The disodium salt of the open-chain dimethyl ester of 4,5-dihydroxy-2,4,6-octatriene-1,8-dioic acid.

8. The delta-monolactone of 4,5-dihydroxy-2,4,6-octatriene-1,8-dioic acid having the formula

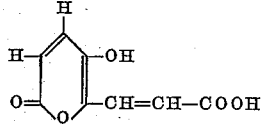

9. A gamma-monolactone alkyl monoester of 4,5-dihydroxy-2,4,6-octatriene-1,8-dioic acid having the formula

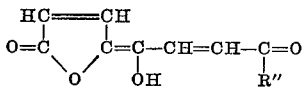

wherein R″ is an alkoxy radical of 1 to 12 carbon atoms.

10. The gamma-monolactone monomethyl ester of 4,5-dihydroxy-2,4,6-octatriene-1,8-dioic acid.

11. A gamma-monolactone monoamide of 4,5-dihydroxy-2,4,6-octatriene-1,8-dioic acid having the formula

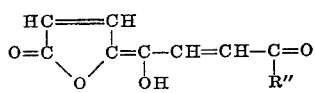

wherein R" is an amino group selected from the class consisting of $NH_2$, alkylamino and dialkylamino groups wherein the alkyl radicals have not more than 18 carbon atoms.

12. A gamma-monolactone monoamide of 4,5-dihydroxy-2,4,6-octatriene-1,8-dioic acid having the formula

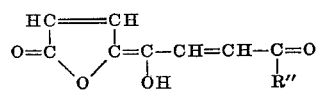

wherein R" is a dialkylamino group wherein the alkyl radicals have not more than 18 carbon atoms.

13. The gamma-monolactone N,N-dimethyl-monoamide of 4,5-dihydroxy-2,4,6-octatriene-1,8-dioic acid.

14. A metal salt of the open-chain 4,5-dihydroxy-2,4,6-octatriene-1,8-dioic acid.

15. A compound selected from the class consisting of the metal salts of open-chain dihydroxy-dioic acids having the formula

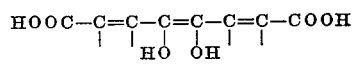

and the alkali metal salts of their open-chain alkyl diesters wherein the alkyl radicals are of 1 to 12 carbon atoms, the delta-monolactones of said acids, the alkali metal salts of the delta-monolactones of said acids, the gamma-monolactone alkyl monoesters of said acids wherein the alkyl radical is of 1 to 12 carbon atoms, and the gamma-monolactone monoamides of said acids wherein the amino group is selected from the class consisting of $NH_2$ and hydrocarbon amino groups wherein the hydrocarbon radicals have not more than 18 carbon atoms, one carbon atom in each of the 2,3 and 6,7 positions of the open-chain dihydroxy-dioic acids of said formula having its free valence satisfied by R and the other carbon atom in each of said positions having its free valence satisfied by R', said R and R' being selected from the class consisting of hydrogen, alkoxyaryl wherein the alkoxy radical is not more than 12 carbon atoms and the aryl radical is hydrocarbon of not more than 10 carbon atoms, haloaryl wherein the aryl radical is hydrocarbon of not more than 10 carbon atoms, and monovalent hydrocarbon radicals, free from non-aromatic unsaturation, of not more than 12 carbon atoms.

16. Process for preparing alkali metal salts of open-chain dihydroxy-dioic acids which comprises reacting [$\Delta^{2,2'(5H,5'H)}$-bifuran]-5,5'-dione with an alkali metal hydroxide in aqueous medium, acidifying the resulting reaction mixture with acetic acid, and separating as the resulting product an alkali metal salt of the open-chain 4,5-dihydroxy-2,4,6-octatriene-1,8-dioic acid.

17. Process which comprises reacting [$\Delta^{2,2'(5H,5'H)}$-bifuran]-5,5'-dione with a basic reagent selected from the class consisting of aqueous alkali metal hydroxides, alkali metal alkoxides of up to 12 carbon atoms in an alkanol of up to 12 carbon atoms, ammonium hydroxide and primary alkyl and secondary dialkyl monoamines wherein the alkyl radicals are of not more than 18 carbon atoms, acidifying the resulting reaction mixture with an acid selected from the class consisting of acetic, hydrochloric, and phosphoric acids, and separating as the resulting product a compound selected from the class consisting of an alkali metal salt of the open-chain 4,5-dihydroxy-2,4,6-octatriene-1,8-dioic acid, the delta-monolactone of said acid, a gamma-monolactone monoester of said acid, and a gamma-monolactone monoamide of said acid.

18. Process which comprises reacting a basic reagent selected from the class consisting of aqueous alkali metal hydroxides, alkali metal alkoxides of up to 12 carbon atoms in an alkanol of up to 12 carbon atoms, ammonium hydroxide and primary alkyl and secondary dialkyl monoamines wherein the alkyl radicals are of not more than 18 carbon atoms, with a dilactone having one of the structural formulas

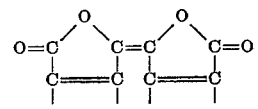

and

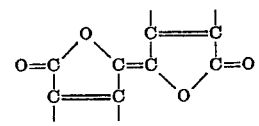

wherein one free valence of each ring is satisfied by R and the other free valence of each ring is satisfied by R', said R and R' being selected from the class consisting of hydrogen, haloaryl wherein the aryl radical is hydrocarbon of not more than 10 carbon atoms, alkoxyaryl wherein the alkoxy radical is not more than 12 carbon atoms and the aryl radical is hydrocarbon of not more than 10 carbon atoms, and monovalent hydrocarbon radicals, free from non-aromatic unsaturation, of not more than 12 carbon atoms, acidifying the resulting reaction mixture with an acid selected from the class consisting of acetic, hydrochloric and phosphoric acids, and separating as the resulting product a compound selected from the class consisting of an alkali metal salt of an open-chain dihydroxy-dioic acid, the delta-monolactone of said acid, a gamma-monolactone monoester of said acid, and a gamma-monolactone monoamide of said acid.

References Cited in the file of this patent

UNITED STATES PATENTS

| | | |
|---|---|---|
| 2,493,373 | Wolff et al. | Jan. 3, 1950 |
| 2,493,375 | Wolff et al. | Jan. 3, 1950 |
| 2,659,733 | Folkers | Nov. 17, 1953 |
| 2,704,296 | Dobratz | Mar. 15, 1955 |
| 2,726,250 | Clauson-Kaas | Dec. 6, 1955 |
| 2,729,652 | Nordt | Jan. 3, 1956 |
| 2,783,270 | Polly et al. | Feb. 26, 1957 |
| 2,785,194 | Hoare | Mar. 12, 1957 |
| 2,791,590 | Rapp | May 7, 1957 |
| 2,800,507 | Long | July 23, 1957 |

OTHER REFERENCES

Knox et al.: J. Biol. Chem., vol. 216, No. 2, p. 489, October 1955.

Bredt: Annalen, vol. 256, pp. 314–331 (1889).

Asahina: J. Pharm. Soc. Jap., vol. 9, No. 461, pp. 1–9 (1920).